United States Patent
Haven (10) Patent No.: US 9,830,435 B2
(45) Date of Patent: Nov. 28, 2017

(54) METHOD AND SYSTEM FOR PROVIDING LOGIN AS A SERVICE

(71) Applicant: salesforce.com, inc., San Francisco, CA (US)

(72) Inventor: Richard Haven, Daly City, CA (US)

(73) Assignee: Salesforce.com, Inc., San Francisco, CA (US)

( * ) Notice: Subject to any disclaimer, the term of this patent is extended or adjusted under 35 U.S.C. 154(b) by 380 days.

(21) Appl. No.: 13/633,407

(22) Filed: Oct. 2, 2012

(65) Prior Publication Data

US 2013/0086667 A1    Apr. 4, 2013

Related U.S. Application Data

(60) Provisional application No. 61/543,138, filed on Oct. 4, 2011.

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| G06F 21/31 | (2013.01) | |

(52) U.S. Cl.
CPC ......... G06F 21/31 (2013.01); H04L 63/0815 (2013.01); H04L 63/0892 (2013.01)

(58) Field of Classification Search
CPC ... H04L 63/10; H04L 63/08; H04L 29/06768; G06F 21/62; G06F 21/31; G06F 21/41
USPC .............................. 726/7, 1–6, 8–10, 12, 21
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

Sending temp password when users first registered—is that good for anything? IT Security Stack Exchange Sep. 11, 2011.*

(Continued)

*Primary Examiner* — Dede Zecher
*Assistant Examiner* — Vadim Savenkov
(74) *Attorney, Agent, or Firm* — Dergosits & Noah LLP; Todd A. Noah (57) ABSTRACT

Systems and methods are provided for providing login as a service. A system receives, via a customer server, a request from a user computer to login to a customer application provided by the customer server. The system outputs a login form to the user computer, receives a modified login form from the user computer, and determines whether the modified login form enables the user computer to login to the customer application. If the modified login form enables the user computer to login to the customer application, the system notifies the customer server that the modified login form enables the user computer to login to the customer application.

19 Claims, 4 Drawing Sheets

(56) References Cited

U.S. PATENT DOCUMENTS

| | | | |
|---|---|---|---|
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,701,438 B1* | 3/2004 | Prabandham et al. | 726/11 |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,360,096 B2* | 4/2008 | Bracewell et al. | 713/183 |
| 7,401,094 B1 | 7/2008 | Kesler | |
| 7,620,655 B2 | 11/2009 | Larsson | |
| 7,698,160 B2 | 4/2010 | Beaven et al. | |
| 7,831,836 B2* | 11/2010 | Beck et al. | 713/183 |
| 7,908,649 B1* | 3/2011 | Arora et al. | 726/7 |
| 8,010,663 B2 | 8/2011 | Firminger et al. | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,275,836 B2 | 9/2012 | Beaven et al. | |
| 8,346,217 B2* | 1/2013 | Crawford et al. | 455/411 |
| 8,499,339 B2* | 7/2013 | Chao et al. | 726/5 |
| 9,274,669 B1* | 3/2016 | Funderburk | G06F 3/0481 |
| 2001/0044791 A1 | 11/2001 | Richter et al. | |
| 2002/0042883 A1* | 4/2002 | Roux et al. | 713/201 |
| 2002/0072951 A1 | 6/2002 | Lee et al. | |
| 2002/0082892 A1 | 6/2002 | Raffel | |
| 2002/0120867 A1* | 8/2002 | Mitchell et al. | 713/201 |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0158743 A1* | 8/2004 | Ham et al. | 713/201 |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0125677 A1* | 6/2005 | Michaelides | 713/185 |
| 2007/0214498 A1* | 9/2007 | Pindra | H04L 63/08 726/4 |
| 2008/0208717 A1* | 8/2008 | Suleymanov | 705/27 |
| 2009/0063415 A1 | 3/2009 | Chatfield et al. | |
| 2009/0260064 A1* | 10/2009 | McDowell et al. | 726/4 |
| 2010/0050243 A1* | 2/2010 | Hardt | H04L 63/0823 726/6 |
| 2011/0184748 A1* | 7/2011 | Fierro et al. | 705/2 |
| 2011/0277024 A1* | 11/2011 | Begley et al. | 726/7 |

OTHER PUBLICATIONS

M. Alam, X. Zhang, K. Khan, and G. Ali, "xDAuth: A scalable and lightweight framework for cross domain access control and delegation," in SACMAT, 2011, pp. 31-40.*

* cited by examiner

METHOD AND SYSTEM FOR PROVIDING LOGIN AS A SERVICE

CLAIM OF PRIORITY

This application claims the benefit of U.S. Provisional Patent Application 61/543,138 entitled METHODS AND SYSTEMS FOR PROVIDING LOGIN AS A SERVICE, by Richard Haven, Oct. 4, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Providing Login as a Service

One or more implementations relate generally to providing login as a service.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In computer security, a login refers to the credentials required to obtain access to a computer system. Logging in is the process by which individual access to a computer system is controlled by identifying and authenticating a user through the credentials presented by the user. Logging in is usually used to enter a specific page, which trespassers cannot see. Once the user is logged in, a login token may be used to track what actions the user has taken while connected to the site. There can be different methods of logging in that may be via image, fingerprints, eye scan, password (oral or textual input), etc. Independent software developers and small software development companies may want to focus on the operation of their on-line web and desktop applications instead of focusing on user management. Accordingly, it is desirable to provide techniques that enable a database system to improve the performance, efficiency, and the ease of use of logins for software developers.

BRIEF SUMMARY

In accordance with embodiments, there are provided systems and methods for providing login as a service for customers of this service. Instead of processing a request from a user computer to login to a customer application provided by a customer server, the customer server sends the request to a login server. The login server substitutes for the customer server by outputting a login form to the user computer, receiving a modified login form from the user computer, and determining whether the modified login form enables the user computer to login to the customer application. The login server notifies the customer server whether or not the modified login form enables the user computer to login to the customer application. The login server allows software developers to configure login and registration processes that their users will follow, but frees these developers from having to create or maintain these processes. Therefore, the login server frees the customer server and the customer application from focusing on user management, enabling the focus to remain on the operation of the customer server and the customer application.

While one or more implementations and techniques are described with reference to an embodiment in which providing login as a service is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for providing login as a service.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing login as a service will be described with reference to example embodiments.

The following detailed description will first describe a method for a login server to assume user management responsibilities on behalf of a customer server.

Next, a block diagram of a system for providing login as a service in an embodiment is described.

Figure 1:
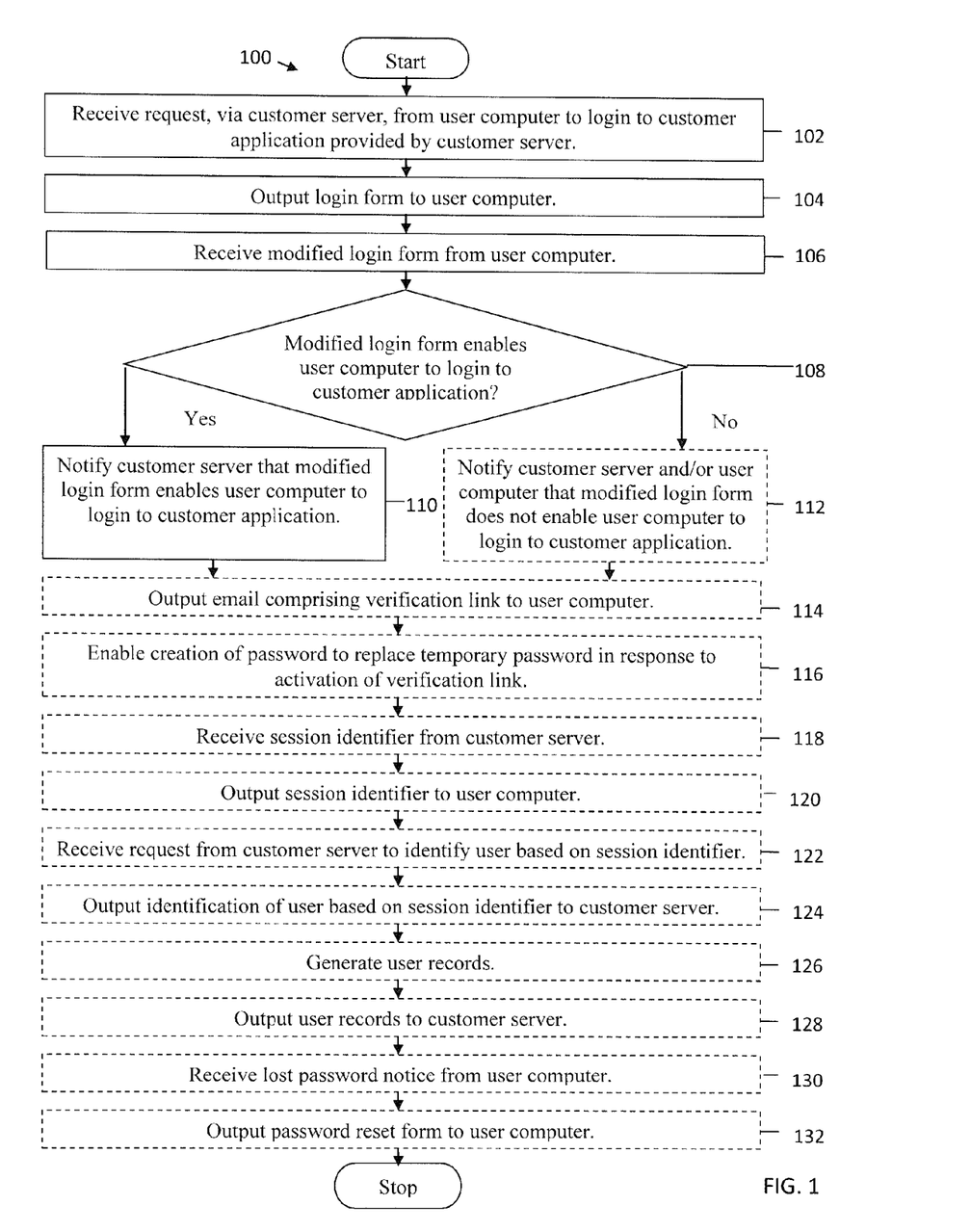
FIG. 1 is an operational flow diagram illustrating a high level overview of a method for providing login as a service in an embodiment.

FIG. 1 is an operational flow diagram illustrating a high level overview of a method 100 for providing login as a service in an embodiment. As shown in FIG. 1, a login server in a database system can assume user management responsibilities on behalf of a customer server.

In block 102, a request is received, via a customer server, from a user computer to login to a customer application provided by the customer server. For example and without limitation, this can include a login server receiving a request, via Acme Corporation's server, from John Smith's computer to login to a tax preparation application provided by Acme Corporation's server. The login server may receive the request because Acme Corporation's server redirected the request to the login server, which enables the user computer to view a login page that the login computer customized for Acme Corporation. Alternatively, the login server may receive the request because Acme Corporation's server executed embedded login code, such as customized HTML fragments or Flash blocks, in one of their tax preparation webpages, which executed an application program interface that communicates with the login server.

In block 104, a login form is output to a user computer. By way of example and without limitation, this can include the login server outputting a login form to John Smith's computer, freeing Acme Corporation's server from this responsibility. The login form may include password rules for password length, password composition, password complexity, password reuse, and/or password similarity to a username and/or a user email address. The login form may include a challenge-response test, such as CAPTCHA, to ensure that modifications to the login form will generated by a person instead of a computer that generates junk email or unsolicited bulk email.

In block 106, a modified login form is received from a user computer. In embodiments, this can include the login server receiving John Smith's modified login form, freeing Acme Corporation's server from this responsibility. The modified login form may require the user to submit a user email address, a username, and/or a user created password. If the login form included a security question, then the modified login form includes a security answer that may be used to login to the requested application and/or to reset a lost password. The modified login form may include user billing information, such as a billed amount, a frequency of billing, and a method of billing payment, such as a credit card, Paypal®, Google® Checkout, etc. If the customer server bills users for accessing the customer application, the login process may be referred to as a registration process. Each user may have their own individual billing information, or some users may depend on another user's billing information, such as block licensing. The customer, as the administrator of their users, may disable individual users, and can configure for users to be automatically disabled from logging in when the users' billing information is no longer valid.

In block 108, a determination is made whether a modified login form enables a user computer to login to a customer application. For example and without limitation, the login server verifies or validates information in John Smith's modified login form, which may include verifying or validating billing information, to determine whether John Smith's computer is enabled to login to the tax preparation application provided by Acme Corporation. If the login server determines that the modified login form enables the user computer to login to the customer application, the method 100 continues to block 110. If the login server determines that the modified login form does not enable the user computer to login to the customer application, the method 100 proceeds to block 112. When the login server determines whether John Smith's modified login form enables John Smith's computer to login to the tax preparation application, the login server may detect duplicate user billing information, which may indicate fraudulent use of billing information. When the login server determines whether John Smith's modified login form enables John Smith's computer to login to the tax preparation application, the login computer may determine whether a proposed login protocol is acceptable based on login protocols specified by Acme Corporation, such as protocols for Facebook®, Google®, Twitter®, OpenID®, and Yahoo®.

In block 110, a customer server is notified that a modified login form enables a user computer to login to a customer application. By way of example and without limitation, the login server notifies Acme Corporation's server that John Smith's modified login form enables John Smith's computer to login to the tax preparation application provided by Acme Corporation. The notification may include expiration information for John Smith's computer to login to the tax preparation application, such as a duration of time for which logging in is enabled or a number of occasions for which logging in is enabled. The notification may include John Smith's internet protocol address. Then the method 100 proceeds to block 114. After this notification, the customer may include its own approval process before the user computer is enabled to login to the customer's application. Once the login process is complete, the login server may redirect John Smith's computer to a webpage for the tax preparation application provided by Acme Corporation.

In block 112, a customer server and/or a user computer are optionally notified that a modified login form does not enable the user computer to login to a customer application. In embodiments, the login server notifies Acme Corporation's server and/or John Smith's computer that John Smith's modified login form does not enable John Smith's computer to login to the tax preparation application provided by Acme Corporation. Then the method 100 continues to block 114.

In block 114, an email comprising a verification link is optionally output to a user computer. For example and without limitation, the login server outputs an email customized for Acme Corporation that includes a verification link customized for Acme Corporation to John Smith's computer, freeing Acme Corporation's server from this responsibility.

In block 116, creation of a password to replace a temporary password is optionally enabled in response to activation of a verification link. By way of example and without limitation, the login server enables creation of a new password to replace a temporary password in response to John Smith's activation of the verification link, freeing Acme Corporation's server from this responsibility. Lost password protocol is configured by the application server's owner. The user may have created the temporary password, or the temporary password may have been randomly generated. Alternatively, activation of the verification link may be sufficient to complete the login process without the resetting of a password.

In block 118, a session identifier is optionally received from a customer server. In embodiments, the login server receives a session identifier for accessing the tax preparation application from Acme Corporation's server.

In block 120, a session identifier is optionally redirected to a user computer. For example and without limitation, the login server redirects the session identifier for accessing the tax preparation application provided by Acme Corporation's server to John Smith's computer.

In block 122, a request is optionally received from a customer server to identify a user based on a session identifier. By way of example and without limitation, after John Smith's computer has used a session identifier for accessing the tax preparation application provided by Acme Corporation's server to login to the tax preparation application, the login server receives a request from Acme Corporation's server to identify a user based on the session identifier for accessing the tax preparation application that John Smith's computer used. Acme Corporation's server rejects any requests for access that do not include a properly generated session identifier.

In block 124, an identification of a user based on a session identifier is optionally output to a customer server. In embodiments, the login server outputs an identification of John Smith based on the session identifier for accessing the tax preparation application used by John Smith's computer to Acme Corporation's server.

In block 126, user records are optionally generated. For example and without limitation, the login server generates user records that include user identifiers, login records, failed logins, suspicious user records, and upcoming login expirations, freeing Acme Corporation's server from this responsibility.

In block 128, user records are optionally output to a customer server. By way of example and without limitation, the login server outputs user records, which include John Smith's user records, to Acme Corporation's server. As their users' administrator, the customer can review and manage the user records individually and in bulk, such as downloading reports of user records sorted by a user name, a user email address, a login creation date, a most recent login date, and/or a login renewal date.

In block 130, a lost password notice is optionally received from a user computer. In embodiments, the login server receives a redirected lost password notice from John Smith's computer.

In block 132, a password reset form is optionally output to a user computer. For example and without limitation, the login server outputs a password reset form to John Smith's user computer, freeing Acme Corporation's server from this responsibility. Lost password protocol is configured by the application server's owner. The password reset form may have a specified lifespan.

The method 100 may be repeated as desired. Although this disclosure describes the blocks 102-132 executing in a particular order, the blocks 102-132 may be executed in a different order.

Figure 2:
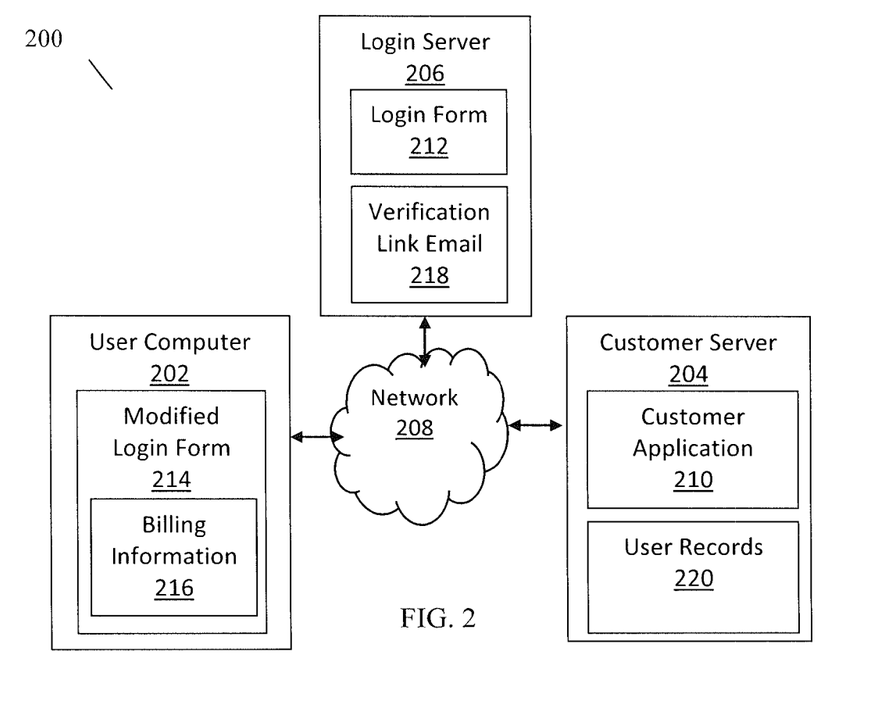
FIG. 2 illustrates a block diagram of a system for providing login as a service in an embodiment.

FIG. 2 illustrates a block diagram of a system that provides login as a service in an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of data for different client users. In an embodiment, the system 200 represents a cloud computing system that includes a user computer 202, a customer server 204, and a login server 206 that communicate via a network 208. Although FIG. 2 depicts the system 200 with one computer 202, two servers 204-206, and one network 208, the system 200 may include any number of computers 202, any number of servers 204-206, and any number of networks 208. The user computer 202, which may be part of a mobile computing device, enables a user to communicate with the servers 204-206 in a distributed system. Instead of processing a request from the user computer 202 to login to a customer application 210 provided by the customer server 204, the customer server 204 sends the request to the login server 206. The login server 206 substitutes for the customer server 204 by outputting a login form 212 to the user computer 202, receiving a modified login form 214 from the user computer 202, and determining whether the modified login form 214 enables the user computer to login to the customer application 210. The login server 206 notifies the customer server 204 whether or not the modified login form 214 enables the user computer 202 to login to the customer application 210. The modified login form 214 may include billing information 216. The login server 206 may send a verification link email 218 to the user computer to complete the login process, and may provide the customer server 204 with user records 220. The login server 206 allows software developers to configure login and registration processes that their users will follow, but frees these developers from having to create or maintain these processes. Therefore, the login server 206 frees the customer server 204 and the customer application 210 from focusing on user management, enabling the focus to remain on the operation of the customer server 204 and the customer application 210.

System Overview

Figure 3:
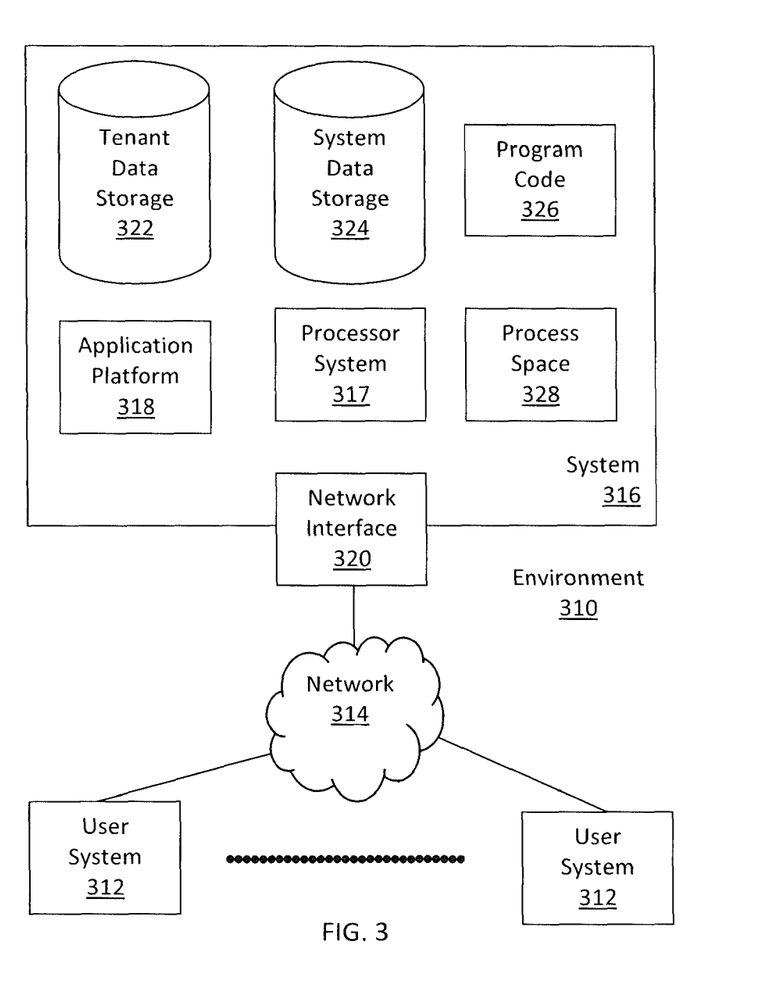
FIG. 3 illustrates a block diagram of an example of an environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
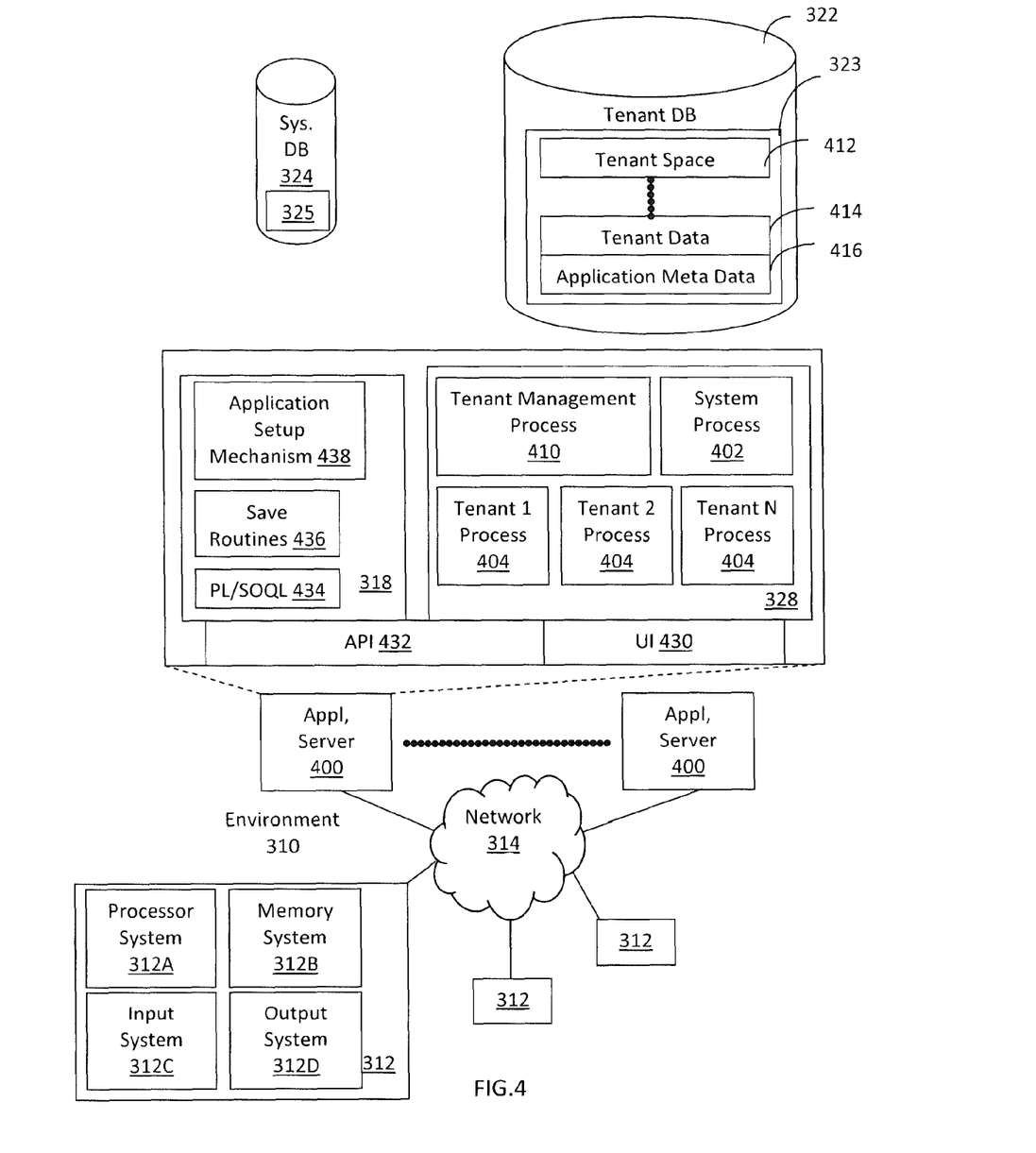
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers 4001-400N, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 34 that provides a programming language style interface extension to API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server 4001 might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for providing login as a service, the apparatus comprising:
    a processor; and
    one or more stored sequences of instructions which, when executed by the processor, cause the processor to perform operations of:
        receiving, by a login server, a login request redirected from a customer server, the redirected login request being received when a user computer requests to login directly to a customer application provided by the customer server, the customer application being a desktop application;
        outputting, by the login server, a login form to the user computer within the customer application;
        receiving, by the login server, a modified login form from the user computer via the customer application, the modified log in form creating a proposed login protocol for logging into the customer application;
        determining, by the login server, whether the received modified login form enables the user computer to login to the customer application by verifying, by the login server, that the proposed login protocol is acceptable based on a customer specified login protocol associated with the customer server; and
        notifying, by the login server, the customer server that the modified login form enables the user computer to login to the customer application in response to a determination that the modified login form enables the user computer to login to the customer application.

2. The apparatus of claim 1, wherein the login form comprises password rules for at least one of password length, password composition, password complexity, password reuse, and password similarity to at least one of a username and a user email address.

3. The apparatus of claim 1, wherein the modified login form requires at least one of a user email address, a username, and a user created password.

4. The apparatus of claim 1, wherein notifying the customer server that the modified login form enables the user computer to login to the customer application comprises outputting a user internet protocol address to the customer server.

5. The apparatus of claim 1, further comprising the operation of notifying, by the login server, at least one of the customer server and the user computer that the modified login form does not enable the user computer to login to the customer application in response to a determination that the modified login form does not enable the user computer to login to the customer application.

6. The apparatus of claim 1, further comprising the operations of:
    outputting, by the login server, an email comprising a verification link to the user computer; and
    enabling, by the login server, the creation of a password to replace a temporary password in response to activation of the verification link.

7. The apparatus of claim 1, further comprising the operations of:
    receiving, by the login server, a session identifier from the customer server;
    redirecting, by the login server, the session identifier to the user computer;
    receiving, by the login server, a login request from the customer server to identify a user based on the session identifier; and
    outputting, by the login server, an identification of the user based on the session identifier to the customer server.

8. The apparatus of claim 1, further comprising the operations of:
    generating, by the login server, user records, wherein the user records comprise at least one of user identifiers, login records, failed logins, suspicious user records, upcoming login expirations; and
    outputting, by the login server, the user records to the customer server, wherein the user records are sorted by at least one of a user name, a user email address, a login creation date, a most recent login date, and a login renewal date.

9. The apparatus of claim 1, further comprising the operations of:
    receiving, by the login server, a lost password notice from user computer; and
    outputting, by the login server, a password reset form to the user computer.

10. A non-transitory machine-readable medium carrying one or more sequences of instructions for providing login as a service, which instructions, when executed by one or more processors, cause the one or more processors to carry out the operations of:
    receiving, by a login server, a login request redirected from a customer server, the redirected login request being received when a user computer requests to login directly to a customer application provided by the customer server, the customer application being a desktop application;
    outputting, by the login server, a login form to the user computer within the customer application;
    receiving, by the login server, a modified login form from the user computer via the customer application, the modified log in form creating a proposed login protocol for logging into the customer application;
    determining, by the login server, whether the received modified login form enables the user computer to login to the customer application by verifying, by the login server, that the proposed login protocol is acceptable based on a customer specified login protocol associated with the customer server, the modified login form including user billing information; and
    notifying, by the login server, the customer server that the modified login form enables the user computer to login to the customer application in response to a determination that the modified login form enables the user computer to login to the customer application.

11. The machine-readable medium of claim 10, wherein the login form comprises a challenge-response test to ensure that the modified login form is generated by a person.

12. The machine-readable medium of claim 10, wherein the login form comprises a security question and the modified login form comprises a security answer.

13. The machine-readable medium of claim 10, wherein the user billing information comprises at least one of a billed amount, a frequency of billing, and a method of billing payment.

14. The machine-readable medium of claim 10, wherein determining whether the modified login form enables the user computer to login to the customer application further comprises detecting duplicate user billing information.

15. The machine-readable medium of claim 10, wherein the notification comprises expiration information for the user computer to login to the customer application.

16. A method for providing login as a service, the method comprising:
- receiving a login request, by a login server, the login request being redirected via a customer server from a user computer requesting to login directly to a customer application provided by the customer server, the customer application being a desktop application;
- outputting, by the login server, a login form to the user computer within the customer application;
- receiving, by the login server, a modified login form from the user computer via the customer application, the modified log in form creating a proposed login protocol for logging into the customer application;
- determining, by the login server, whether the received modified login form enables the user computer to login to the customer application by verifying, by the login server, that the proposed login protocol is acceptable based on a customer specified login protocol associated with the customer server; and
- notifying, by the login server, the customer server that the modified login form enables the user computer to login to the customer application in response to a determination that the modified login form enables the user computer to login to the customer application.

17. The method of claim 16, wherein the modified login form comprises user billing information.

18. A method for providing login as a service, the method comprising:
- causing a login server to execute code to receive a login request, via embedded login code in a customer webpage executed by a customer server, redirected via the customer server from a user computer requesting to login directly to a customer application provided by the customer server, the login request being made at the customer server before being redirected to the login server, the customer application being a desktop application;
- causing the login server to execute code to output a login form to the user computer within the customer application;
- causing the login server to execute code to receive a modified login form from the user computer via the customer application, the modified log in form creating a proposed login protocol for logging into the customer application;
- causing the login server to execute code to determine whether the received modified login form enables the user computer to login to the customer application verifying, by the login server, that the proposed login protocol is acceptable based on a customer specified login protocol associated with the customer server; and
- causing the login server to execute code to notify the customer server that the modified login form enables the user computer to login to the customer application in response to a determination that the modified login form enables the user computer to login to the customer application.

19. The method of claim 18, wherein the embedded login code in the customer webpage comprises code associated with an application program interface.

* * * * *